US008238660B2

(12) United States Patent
Lin et al.

(10) Patent No.: US 8,238,660 B2
(45) Date of Patent: Aug. 7, 2012

(54) HYBRID GRAPH MODEL FOR UNSUPERVISED OBJECT SEGMENTATION

(75) Inventors: Zhouchen Lin, Beijing (CN); Guangcan Liu, Beijing (CN); Xiaoou Tang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/100,891

(22) Filed: May 4, 2011

(65) Prior Publication Data

US 2011/0206276 A1 Aug. 25, 2011

Related U.S. Application Data

(63) Continuation of application No. 11/860,428, filed on Sep. 24, 2007, now Pat. No. 7,995,841.

(51) Int. Cl.
*G06K 9/34* (2006.01)
*G06K 9/46* (2006.01)
*G06K 9/66* (2006.01)

(52) U.S. Cl. ......................... 382/173; 382/190; 382/195

(58) Field of Classification Search ........................ None
See application file for complete search history.

(56) References Cited

U.S. PATENT DOCUMENTS

| | | | |
|---|---|---|---|
| 5,825,922 A | 10/1998 | Pearson et al. | |
| 6,731,799 B1 | 5/2004 | Sun et al. | |
| 6,973,212 B2 | 12/2005 | Boykov et al. | |
| 2004/0140992 A1 | 7/2004 | Marquering et al. | |
| 2005/0254546 A1 | 11/2005 | Rittscher et al. | |
| 2007/0014473 A1 | 1/2007 | Slabaugh et al. | |
| 2007/0122039 A1 | 5/2007 | Zhang et al. | |
| 2007/0183663 A1* | 8/2007 | Wang et al. | 382/173 |
| 2007/0185946 A1* | 8/2007 | Basri et al. | 708/200 |
| 2007/0273696 A1* | 11/2007 | Cheng et al. | 345/467 |
| 2009/0080774 A1 | 3/2009 | Lin et al. | |

OTHER PUBLICATIONS

Agarwal, et al., "Learning a Sparse Representation for Object Detection", Springer-Verlag, In the Proceedings of the Seventh European Conference on Computer Vision, Part IV, 2002, pp. 113-130, 15 pgs.
Anonymous, "A Hybrid Graph Model for Unsupervised Object Segmentation", ICCV 2007 Submission #372, 10 pages.
Cao, et al., "Spatially Coherent Latent Topic Model for Concurrent Segmentation and Classification of Objects and Scenes", In the Proceedings of the 11th International Conference on Computer Vision, 2007, 8 pgs.
Leibe, et al., "Combined Object Categorization and Segmentation with an Implicit Shape Model", at <<http://citeseer.ist.psu.edu/cache/papers/cs/30764/http:zSzzSzwww.vision.ethz.chzSzpublzSzleibe-ism-slcv04.pdf/leibe04combined.pdf>>, ECCV, 2004, pp. 16.
Mori, "Guiding Model Search Using Segmentation", In the Proceedings of the Tenth International Conference on Computer Vision, vol. 2, 2005, pp. 1417-1423, 7 pgs.

(Continued)

*Primary Examiner* — Li Liu
(74) *Attorney, Agent, or Firm* — Lee & Hayes, PLLC; Shirley L. Anderson

(57) ABSTRACT

This disclosure describes an integrated framework for class-unsupervised object segmentation. The class-unsupervised object segmentation occurs by integrating top-down constraints and bottom-up constraints on object shapes using an algorithm in an integrated manner. The algorithm describes a relationship among object parts and superpixels. This process forms object shapes with object parts and oversegments pixel images into the superpixels, with the algorithm in conjunction with the constraints. This disclosure describes computing a mask map from a hybrid graph, segmenting the image into a foreground object and a background, and displaying the foreground object from the background.

19 Claims, 7 Drawing Sheets

OTHER PUBLICATIONS

Prasad, et al., "Learning Class-Specific Edges for Object Detection and Segmentation", available at least as early as Jul. 3, 2007, at <<http://eprints.pascal-network.org/archive/00002295/01/prasad-06a.pdf>>, pp. 11.

Tu, et al., "Image Parsing: Unifying Segmentation, Detection, and Recognition", In the Proceedings of the Ninth IEEE International Conference on Computer Vision, vol. 1, 2003, 8 pgs.

Tu, et al., "Recognizing Objects Using Color-Annotated Adjacency Graphs", Lecture Notes in Computer Science, 1999, vol. 1681, 18 pages, available at <<http://users.rsise.anu.edu.au/~hartley/Papers/sicily/sicily.pdf>>.

Yang, et al., "Unsupervised Segmentation of Natural Images via Lossy Data Compression", at <<http://www.eecs.berkeley.edu/~yang/publications/AllenYangCVIU07.pdf>>, Mach 8, 2007, pp. 24.

Zhao, et al., "Closely Coupled Object Detection and Segmentation", In the Proceedings of the Tenth IEEE International Conference on Computer Vision, vol. 1, 2005, pp. 454-461.

* cited by examiner

HYBRID GRAPH MODEL FOR UNSUPERVISED OBJECT SEGMENTATION

RELATED APPLICATION

This divisional application claims priority to commonly assigned co-pending U.S. patent application Ser. No. 11/860,428, U.S. Patent Publication No. 2009-0080774, entitled "Hybrid Graph Model For Unsupervised Object Segmentation," filed on Sep. 24, 2007, which is incorporated by reference herein for all that it teaches and discloses.

TECHNICAL FIELD

This application relates generally to unsupervised object segmentation, and more specifically, to a technique for segmenting a foreground and a background of an image by using an algorithm to integrate segmentation of the image and recognition in a unified framework.

BACKGROUND

Object segmentation is a fundamental problem in computer vision. A typical mechanism for object segmentation is to segment an image into a foreground and a background, with the foreground including object(s) in a class. For example, the class may include birds, cars, airplanes, and the like. The background may include trees, grass, sidewalks, highways, and the like. Typically, there are two categories of algorithms used for object segmentation, supervised and unsupervised.

Supervised algorithms require manually segmenting masks in training images, specific shape templates, or others kinds of prior information (e.g., object part configuration or class fragments). The algorithm may be applicable to a particular object class, a range of objects, or object classes with class dependent prior information. However, the algorithm is only typically capable of handling a small number of classes of objects and most classes may require many training samples due to significant intra-class shapes and appearance variances.

The other category, unsupervised algorithms is a technique where learning or training may not involve human interaction. One unsupervised algorithm technique uses an overlap between automatically extracted object parts (or fragments) to determine the foreground and the background. However, this approach considers individual parts independently, causing shortcomings, such as incorrectly identifying background clutters as foreground parts. Another approach of unsupervised algorithm combines the images together to find a consistent segmentation based on an assumption that the object shape and the color distribution pattern are consistent within a class, and that the color and texture variability within a single object of the class is limited. Thus, each image should only contain one object of the class. While these approaches to object segmentation have pros and cons, none of the approaches allows for unsupervised algorithm to produce accurate object boundaries for images of objects of the same class.

Also, existing unsupervised algorithms are not effectively usable to accurately segment objects, when object segmentation precedes class discovery. Some techniques require the common parts to have similar shape, color, and texture. Thus, these techniques have not provided accurate object boundaries for images of objects of the same class without annotated training images.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, this disclosure describes methods for class-unsupervised object segmentation. In one aspect, the class-unsupervised object segmentation occurs by converting one or more images to grayscale, forming object shapes with object parts, and oversegmenting pixel images into superpixels. Superpixels that are similar in color and texture are grouped into large subregions. This process may integrate top-down constraints and bottom-up constraints on the object shapes by using an algorithm that describes the relationship between the object parts and the superpixels. This process also may integrate recognition and segmentation into a unified framework, and may segment the image into a foreground and a background.

In another aspect, this disclosure describes a method for modeling a relationship between entities associated with an object class or local image features (e.g., object parts, color, texture, spatial adjacency among the superpixels, and the like) for class-unsupervised object segmentation. This modeling may occur, for example, by forming a hybrid graph, representing the entities as vertices, representing a relationship of a conditional dependence of one entity upon another entity, representing a relationship of homogeneous association between a pair of entities, and constructing the hybrid graph including a finite vertices set and an edge set with the entities. This model determines a likelihood of probability, that the entities belonging to the underlying class can be computed by solving an optimization problem.

BRIEF DESCRIPTION OF THE DRAWINGS

The Detailed Description is set forth with reference to the accompanying figures. The teachings are described with reference to the accompanying figures. In the figures, the leftmost digit(s) of a reference number identifies the figure in which the reference number first appears. The use of the same reference numbers in different figures indicates similar or identical items.

DETAILED DESCRIPTION

Overview

Figure 1:
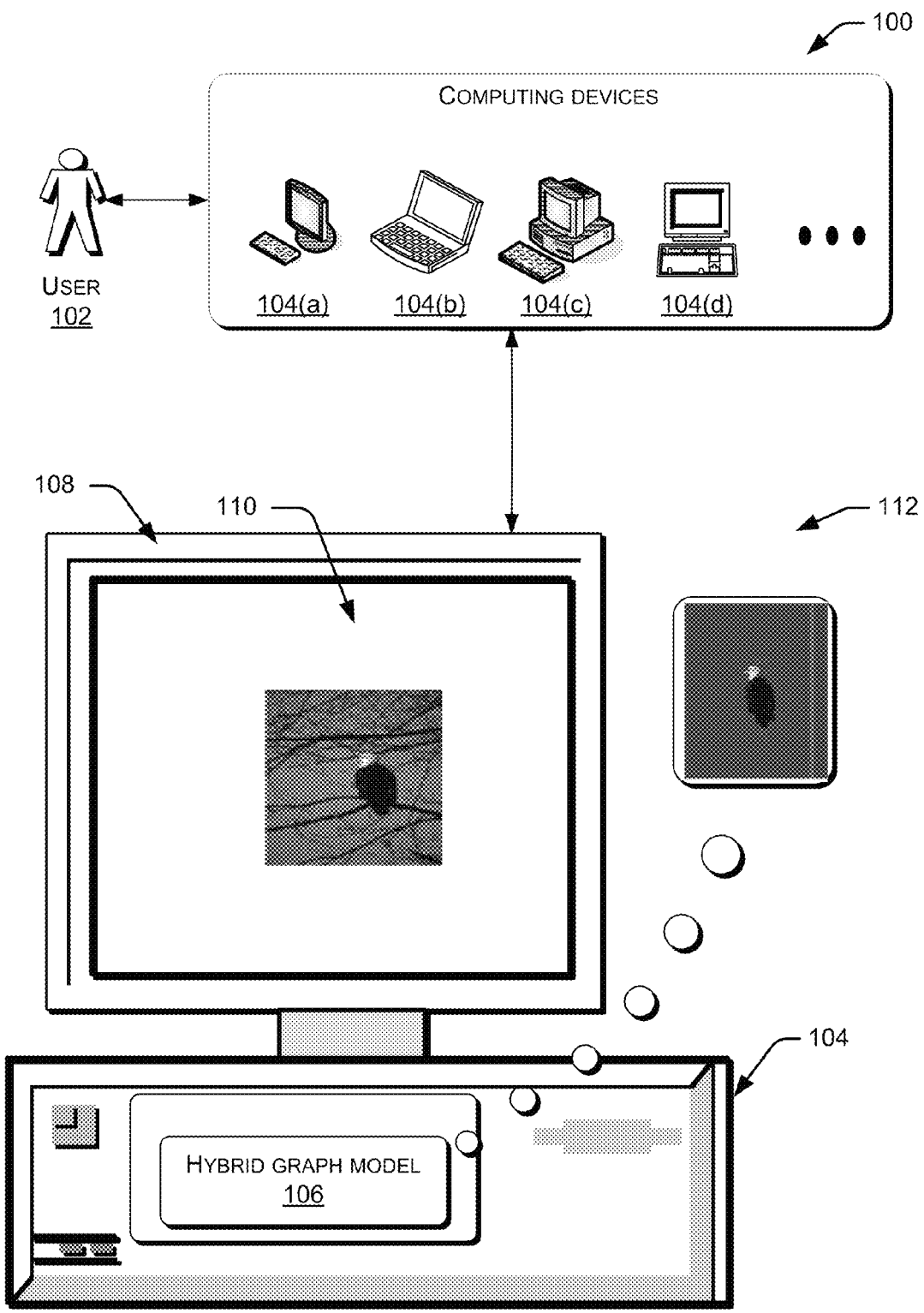
FIG. 1 is a block diagram showing an exemplary class-unsupervised object segmentation system.

This disclosure is directed to a method of class-unsupervised object segmentation. In one example, this disclosure describes how class-unsupervised object segmentation occurs by converting one or more images to grayscale, forming object shapes with object parts, and oversegmenting pixel images into superpixels, where the superpixels that are similar in color and texture are grouped together. This process may also integrate top-down constraints and bottom-up constraints on the object shapes by using an algorithm, which describes a relationship among the object parts and the superpixels. This process may also integrate recognition and segmentation into a unified framework and segment the image into a foreground object and a background.

This disclosure also describes a method for modeling a relationship between entities associated to an object class or local image features for class-unsupervised object segmentation. Entities include, but are not limited to, object parts, color, texture, and spatial adjacency among the superpixels. This modeling occurs by representing the entities as vertices of a hybrid graph, representing a relationship of a conditional dependence of one entity dependent on another entity, representing a relationship of homogeneous association between a pair of entities, and constructing the hybrid graph including a finite vertices set and an edge set with the entities. This model further determines a likelihood of probability that the entities that belong to the underlying class can be computed by solving an optimization problem.

The method uses the relationship among the entities to infer a likelihood of probability of each entity belonging to the object. Each vertex of the hybrid graph is associated with a likelihood of probability. Based on the conditional dependence of one entity upon another entity, a vertex directed component of the hybrid graph may be determined as belonging to the object. The interdependence among the entities forms a Markov Chain with a conditional dependence matrix. Thus, this results in a stationary distribution of the conditional dependence matrix assigning each entity a likelihood of probability of belonging to the object.

Next, the algorithm uses the relationship of a homogeneous association between a pair of entities to identify an undirected component of the hybrid graph. If two entities are strongly associated or similar in color and/or texture, the two entities are more likely to belong to the object or background simultaneously. Thus, the segmentation may minimize a cost of cutting the undirected component.

Thus, these methods for class-unsupervised object segmentation provide a greater variation in shape within a class. In particular, the shape includes, but is not limited to position, size, pose, and profile. Useful outcome with these methods results in a greater variation in color and texture within a class and within an object. Also, the methods allow multiple objects of the same class in each image, and a more accurate output of the object boundaries.

The methods for class-unsupervised object segmentation described herein, are not limited to any particular application, but many be applied in many contexts and environments. By way of example and not limitation, the class-unsupervised object segmentation may be employed in computer vision, animations, template matching, games, cartoons, videos, films, 3D pose in real-time, and the like.

Illustrative System

FIG. 1 is an overview block diagram of an exemplary system 100 for providing class-unsupervised object segmentation. A user 102 is shown with computing device(s) 104 to access the system 100 through a unified framework for class-unsupervised object segmentation. The system 100 may provide class-unsupervised object segmentation as, for example, but not limited to, a tool, a method, a solver, software, an application program, a service, and the like.

Computing devices 104 that are suitable for use with the system 100, include, but are not limited to, a personal computer 104(a), a laptop computer 104(b), a desktop computer 104(c), a workstation computer 104(d), and the like. These various types of computing devices 104 in operation with methods for class-unsupervised object segmentation, are shown in an exemplary application program 106. The application program 106 automatically segments class images without any annotated information of the class.

FIG. 1 illustrates a display monitor 108 on which the class-unsupervised object segmentation is shown in an exemplary application program 106. Here, the application program 106 includes an algorithm for integrating top-down constraints and bottom-up constraints on the object shapes of the images. In particular, the algorithm describes a relationship among entities associated with an object class or local image features (e.g., object parts, color, texture, spatial adjacency among the superpixels, and the like). The exemplary class-unsupervised object segmentation application program 106 displays an image of a bird sitting on a tree 110 on the display monitor 108. The bird, commonly referred to as a foreground object 112, can be automatically segmented from the tree, which in this example is referred to as a background. Thus, the class-unsupervised object segmentation application program 106 is fully automatic to provide an accurate output of the object boundary.

Exemplary Implementation by Modeling a Relationship

Figure 2:
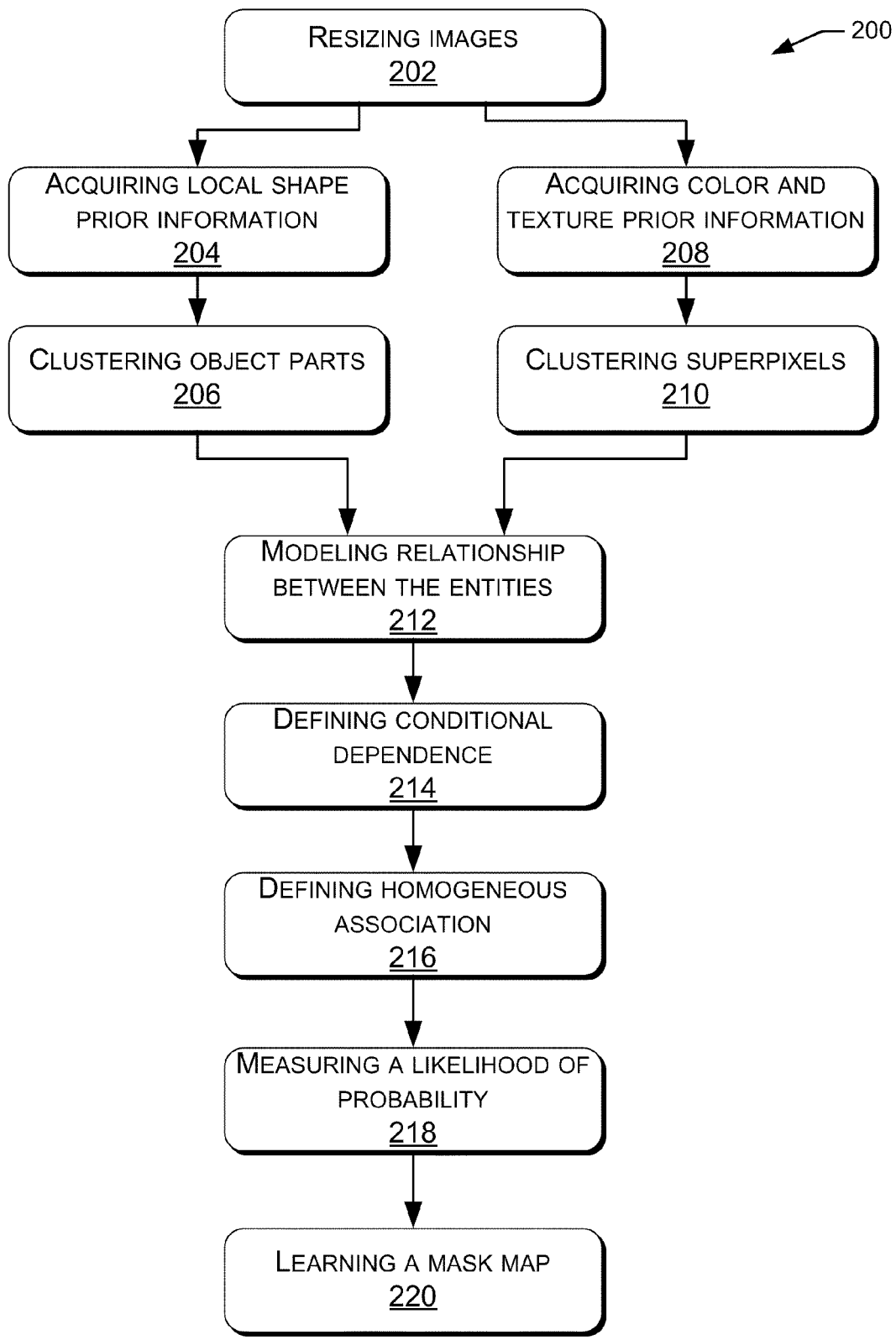
FIG. 2 is a flowchart describing an unsupervised object segmentation according to one exemplary implementation.

FIG. 2 is an overview flowchart of an exemplary implementation for class-unsupervised object segmentation 200. For ease of understanding, the method 200 is delineated as separate steps represented as independent blocks in FIG. 2. However, these separately delineated steps should not be construed as necessarily order dependent in their performance. The order in which the process is described is not intended to be construed as a limitation, and any number of the described process blocks maybe be combined in any order to implement the method, or an alternate method. Moreover, it is also possible that one or more of the provided steps may be omitted.

The class-unsupervised object segmentation method 200 allows automatic segmentation without any annotated training images, given a set of images of objects of the same class. In particular, the automatic segmentation method 200 occurs without any annotated information of a class, as long as there is sufficient diversity present in the background of the image.

In one embodiment, block 202 shows resizing images that contain objects to be used for class-unsupervised object segmentation. The images are modified, changed, or adjusted to a size that is identified or chosen for use in the object segmentation. For example, sizing the images may include a longer side that is approximately 320 pixels. The process converts the images to grayscale. These images are considered as "special" self-training images for extracting the shape prior information of a class.

This process integrates recognition and segmentation into a unified framework. To accomplish this framework, the prior information (e.g., object part configuration or class fragments) of the object class must be acquired.

Block 204 shows acquiring the local shape prior information, also referred to as object parts. This process occurs by using a Harris interest points detector to detect object parts with rich textures. Here, the local shape prior information provides top-down constraints on the object shape, as the object parts are only sparsely distributed across the objects. This process extracts windows of a specific size around the points detected of the object parts. For example, the size may be 25×25 pixels. Here, this process acquires local shape prior information, which includes visual words, a center of a cluster of local windows that have a similar appearance of an object class (e.g., the types of cars).

Next, the process continues to block 206, which illustrates agglomerative clustering of the object parts into the visual words and the spatial distance between visual words. These visual words describe the local appearances of the class. As previously mentioned, this process iterates over the selected images and matches visual words to every detected object parts using a Normalized Grayscale Correlation (NGC) measure. Thus, a visual word representing "object part" is one example of the clustering of local windows. As a result, this process allows a larger variation in shape including a position, a size, a pose, and a profile within a class.

Shown in parallel with acquiring local shape prior information already described, is a process for acquiring color and texture prior information. Block 208 illustrates acquiring color and texture prior information, which are features of the objects. This process starts oversegmenting the images into the superpixels. The color and texture prior information provides bottom-up constraints on the object shape.

Next, the process continues to block 210, which illustrates clustering the superpixels that are similar into a subregion. This clustering is a mid-level algorithm to group the superpixels that are similar in color and/or texture into much larger subregions. Next, the process measures the similarity in color and/or texture between the superpixels to determine whether the superpixels belong to the same subregions. The process allows a larger variation in color and texture within a class and within an object.

Block 212 illustrates incorporating the acquired prior information from the processes described above into modeling a relationship between the entities (e.g., object parts, color, texture, spatial adjacency among the superpixels) at the same time. However, there is difficulty in directly applying shape prior information to the superpixels and color and texture prior information to the object parts. This difficulty arises due to the fact that the object parts are square and the superpixels are irregular. As a result, this process 212 models a relationship between these types of entities by integrating the prior information (local shape with color and texture) into a unified framework.

In an exemplary implementation, the model relationship 212 is a hybrid graph model. The hybrid graph model (HGM) defines a conditional dependence matrix P according to the shape prior information (blocks 204 and 206) and a homogeneous association matrix A according to the color and texture prior information (blocks 208 and 210).

HGM segments images fully automatically without annotated training images. First, a hybrid graph is constructed using G=(V, E) for object segmentation including two types of vertices: $V=V_p \cup V_s$, where $V_p$ is a set of vertices representing the object parts and $V_s$ representing the superpixels. The vertices in $V_p$ are mainly connected by directed edges and those in $V_s$ are connected by undirected edges. Initially, the shape prior information is applied to the object parts, and the color and texture prior information are applied to the superpixels.

The HGM makes these two different prior information interact with each other, where the vertices in $V_p$ not only connect to each other, but also connect to those in $V_s$ by undirected edges. As a result, through the extra undirected edges, the shape prior information can also act on the superpixels and the color and texture prior information can also act on the object parts, as well.

Thus, the learning process occurs by coupling two different subsystems: a recognition system represented by the directed subgraph playing the role of finding the object parts belonging to the object(s) and a segmentation system represented by the undirected subgraph that is responsible of grouping superpixels. Thus, the two subsystems are coupled by the extra undirected edges.

HGM achieves a goal of object recognition by conditional dependence. Block 214 shows defining a conditional dependence matrix P for the entities. The conditional dependence 214 represents a relation of an occurrence of one entity being dependent on the occurrence of the other. Conditional dependence matrix 214 tends to be directed and asymmetric, which represents the concurrence of the object parts when applied in object segmentation. Defining conditional Dependence Matrix P 214 as: $P=[p_{ij}]_{n \times n}$, where P=conditional dependence matrix, $V=\{v_1, \ldots, v_n\}$ be n entities, and $p_{ij}$ measures the conditional dependence of $v_i$ on $v_j$.

HGM achieves the goal of object segmentation by homogeneous association. Block 216 shows defining a homogenous association matrix A for the entities. The homogeneous association matrix A usually measures a "similarity" among the entities. Homogeneous association 216 tends to be undirected and symmetric, which represents the color and texture similarity and a spatial adjacency among the superpixels. Defining homogeneous association matrix A 216 as: $A=[a_{ij}]_{n \times n}$, where A=homogeneous association matrix, $a_{ij}$ measures a homogeneity or similarity between $v_i$ and $v_j$, and $V=\{v_1, \ldots, v_n\}$ be n entities.

Therefore, a general hybrid graph G=(V, E) consists of a finite vertex set V and an edge set E with each edge connecting a pair of vertices. The weights assigned to directed edges and undirected ones correspond to matrix P and matrix A, respectively. The HGM integrates top-down constraints and bottom-up constraints on the object shape by bridging a gap between them. Detailed description of the hybrid graph follows in FIG. 3 and FIG. 4.

Block 218 shows measuring a likelihood of probability of each entity belonging to the object. Given a relationship among the entities, it is possible to infer the likelihood of probability of each entity 218 belonging to the object. Suppose each vertex $v_i$ is associated with a likelihood of probability $\pi_i$. From the directed component of the hybrid graph, if $v_j$ depends on $v_i$, identifying $v_i$ as more important than $v_j$, then $v_i$ is more likely to belong to the object. Hence, an interdependence among the entities forms a Markov Chain with the transition matrix P. Ideally, this results in a stationary distribution $\Pi=(\pi_1, \ldots, \pi_n)^T$ of P that assigns each entity a likelihood of probability:

$$\Pi^T P = \Pi^T. \quad (1)$$

However, from an undirected component of the hybrid graph, if the two entities $v_i$ and $v_j$ are strongly associated, the two entities are more likely to belong to the object or background simultaneously. Therefore, the segmentation cuts cost shown as:

$$\sum_{i,j} a_{ij}(\pi_i - \pi_j)^2. \quad (2)$$

Putting the two criteria together described above, an optimization problem to calculate the likelihood of probability vector Π occurs:

$$\min \|P^T \Pi - \Pi\|^2 + \alpha \sum_{i,j} a_{ij}(\pi_i - \pi_j)^2 \quad (3)$$

$$\text{subject to } \Pi^T \Pi = 1,$$

where α is a positive parameter used to balance the effects of the two criteria.

The solution to equation (3) is an eigenvector associated to a minimum eigenvalue of the following matrix:

$$(I-P)(I-P^T) + \alpha L_A, \quad (4)$$

where $L_A$ is a Laplacian matrix of the undirected component: $L_A = D_A - A$ with $$D_A = \text{diag}\left\{ \sum_{j=1}^{n} a_{1j}, \ldots, \sum_{j=1}^{n} a_{nj} \right\},$$

and I is an identity matrix.

In an exemplary implementation, calculating the likelihood of probability vector Π occurs by using an inverse power method:

i. $\Pi = (1, 1, \ldots, 1)^T, r_0 = -1, r_1 = 0,$ ii. $M = [(I - P)(I - P^T) + \alpha L_A]^{-1},$ iii. Do while $|r_1 - r_0| > 10^{-8}$ $r_0 = r_1$ $\Pi = M\Pi$ iv. $\Pi = \dfrac{\Pi}{\|\Pi\|}$ $r_1 = \Pi^T M \Pi$ v. End while.

Block 220 shows learning a mask map from an image that gives each superpixel a probability of lying inside an object(s). The process integrates the prior information into a unified framework and forms a global decision on the boundaries of the objects. As mentioned previously, difficulty exists in directly applying shape prior information to the superpixels and color and texture prior information to the object parts. A way to overcome this problem is to develop the hybrid graph model to learn a mask map.

This process occurs by fully automatically segmenting the image, a foreground and a background. The foreground includes the object of a class. With this method, there is a more accurate output of object boundaries than previous approaches.

Hybrid Graph with Conditional Dependence and Homogeneous Association

Figure 3:
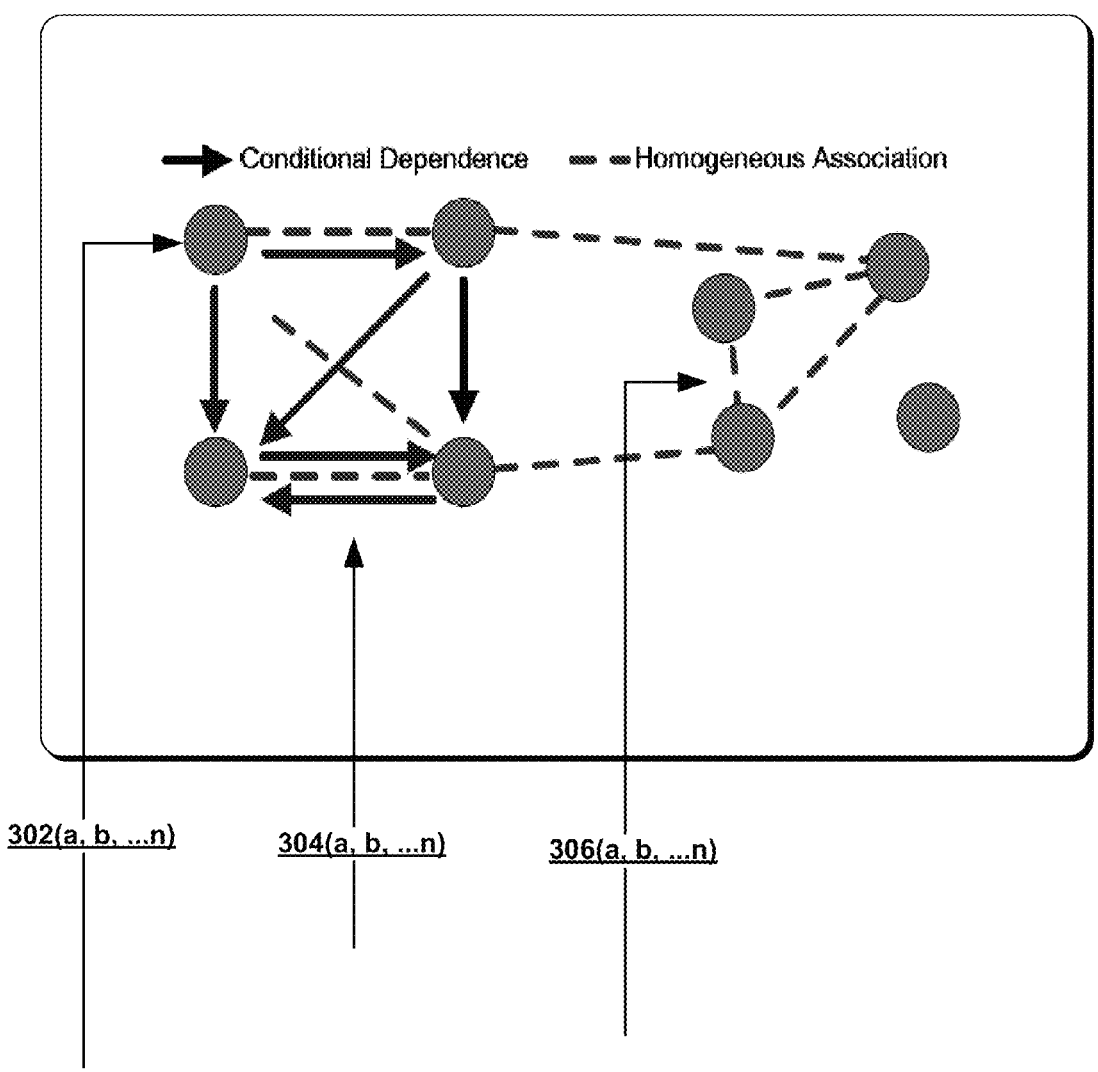
FIG. 3 is a block diagram of an exemplary hybrid graph model with relationships of conditional dependence and homogeneous association.

FIG. 3 is a block diagram of an exemplary hybrid graph 300 shown with relationships of conditional dependence and homogeneous association with the entities.

Shown at 302 is a vertex illustrating an entity in reality. The vertices 302(a, b, . . . n) of a hybrid graph represent the entities associated to the object class or local image features. The vertices 302(a, b, . . . n) are connected by directed edges 304 and/or undirected edges 306.

A directed edge 304(a) represents the relationship of conditional dependence between a pair of entities by forming a connection. The directed edges 304(a, b, . . . n) represent a dependence between the shape prior information of the class for recognition. The directed edges are shown with bold arrows.

An undirected edge 306(a) represents the relationship of homogeneous association between a pair of entities. The undirected edges 306(a, b, . . . n) represent a similarity between the entities. In this example, the similarity is in terms of the color and the texture prior information for segmentation. The undirected edges are shown with broken lines.

Between each pair of vertices 302(a, b, . . . n), there are at most three edges: two directed edges 304(a, b, . . . n) and one undirected edge 306(a). In some scenarios, it is possible that some vertices 302(a, b, . . . n) are isolated.

Hybrid Graph with Object Part and Superpixel

Figure 4:
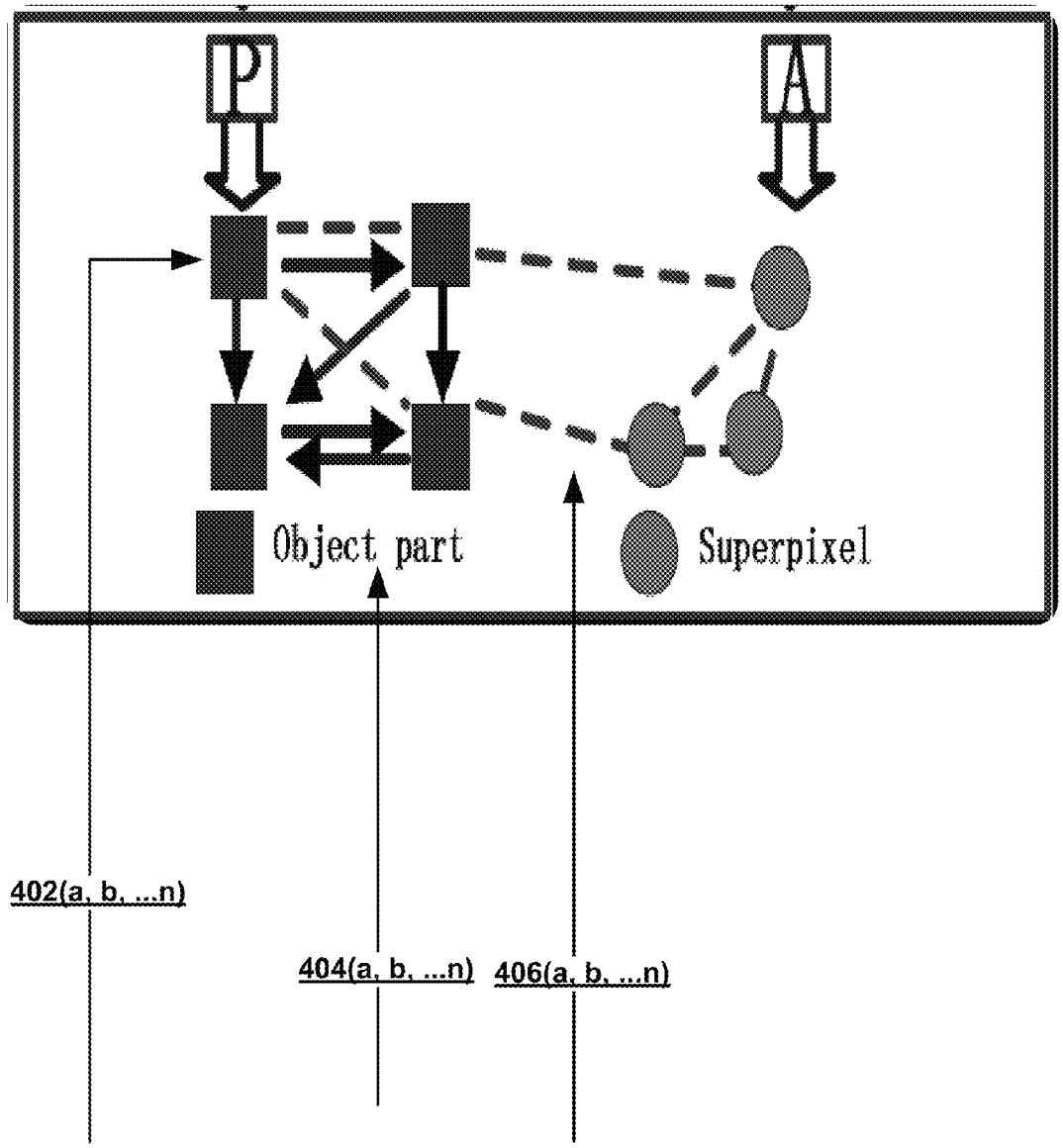
FIG. 4 is a block diagram of an exemplary hybrid graph model with object parts and superpixels.

FIG. 4 is a block diagram of an exemplary hybrid graph 400 shown with relationships of conditional dependence of the object parts and the homogeneous association of superpixels.

Shown at 402 is a vertex illustrating an entity in reality. The vertices 402(a, b, . . . n) of a hybrid graph represent the entities associated to the object class or local image features. The vertices 402(a, b, . . . n) are connected by directed edges 404 and/or undirected edges 406. Between each pair of vertices 402(a, b, . . . n), there are at most three edges: two directed edges 404(a, b, . . . n) and one undirected edge 406. In some scenarios, it is possible that some vertices 402(a, b, . . . n) are isolated.

A directed edge 404(a) represents the relationship of conditional dependence between a pair of entities by forming a connection. The directed edges 404(a, b, . . . n) represent a dependence between the shape prior information of the class for recognition.

An undirected edge 406(a) represents the relationship of homogeneous association between a pair of entities. The undirected edges 406(a, b, . . . n) represent a similarity between the entities, in terms of the color and the texture prior information for segmentation.

Illustrative HGM Based Object Segmentation

Figure 5:
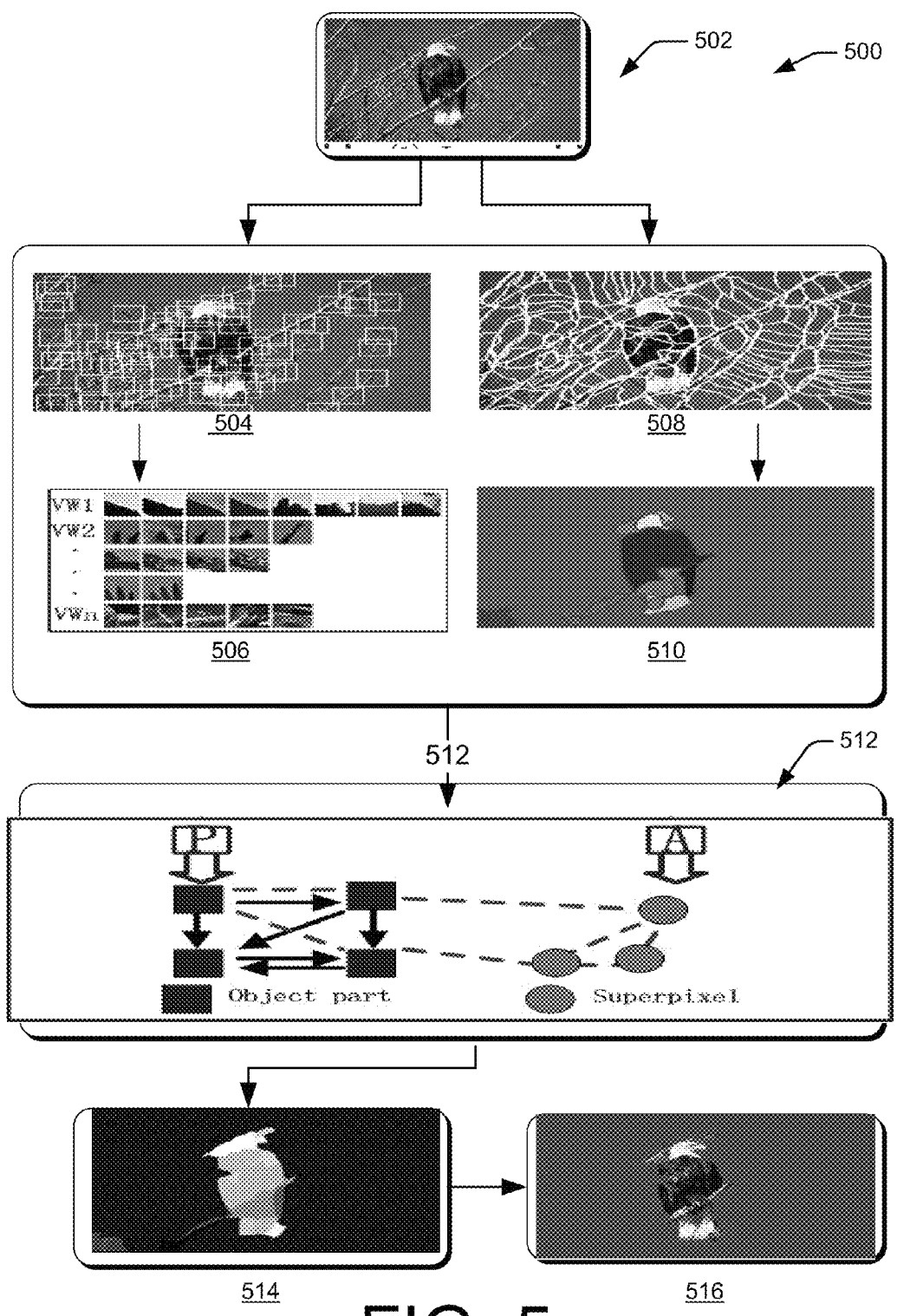
FIG. 5 is a flowchart illustrating object segmentation according to one exemplary implementation.

FIG. 5 is a flowchart of an exemplary implementation for HGM class-unsupervised object segmentation 500. Block 502 shows receiving the image. As mentioned, this image will be resized, adjusted, changed, or modified to a certain size for use in the class-unsupervised object segmentation. The longer side of the image may be sized to approximately 320 pixels. The process converts the images to grayscale. These images are considered as "special" self-training images for extracting the shape prior information of a class.

Proceeding to the left side, block 504 shows acquiring prior information of the object class. Here, acquiring the local shape prior information, also referred to as object parts, occurs by using a Harris interest points detector, which extracts windows according to a size specified around the points detected. For example, the process may extract windows based on a size of 25×25 pixels.

Next, the block continues to block 506, which illustrates agglomerative clustering of the object parts into the visual words and the spatial distance between visual words. These visual words describe the local appearances of the class. The information helps build a codebook, which consists of the visual words and refined by a hybrid graph model for improved accuracy.

Another option is to include a larger shape variation by assuming very weak shape configurations. The process evaluates a spatial distance between visual words. The process iterates over all of the selected images and matches the visual words to every detected object parts using NGC (Normalized Grayscale Correlation) measure. The NGC process helps develop a table of a spatial relation between pairs of visual words, shown as [$vw_i$, $vw_j$, $d_{ij} \sim N(\mu_{ij}, \sigma_{ij})$], where vwi and vwj are two visual words and $N(\mu_{ij}, \sigma_{ij})$ is a Gaussian distribution that fits a distribution of a spatial distance dij between the object parts matched to vwi and vwj. This process evaluates arbitrary object orientation, versus evaluating a direction between object parts.

Shown in parallel with the processing already described, is another process for acquiring color and texture prior information. In this embodiment, block 508 illustrates acquiring color and texture prior information, which are features of the objects. This process starts oversegmenting the images into the superpixels.

Next, the process continues to block 510, illustrates clustering the superpixels that are similar in color and/or texture into a subregion. This clustering is a mid-level algorithm to group the superpixels that are similar into much larger subregions. Then the similarity between the superpixels identifies whether the superpixels belong to the same subregions.

Block 512 illustrates incorporating the acquired prior information from the processes described above into a hybrid graph model. The hybrid graph model (HGM) 512 defines a conditional dependence matrix P according to the shape prior information (blocks 504 and 506) and a homogeneous association matrix A according to the color and texture prior information (blocks 508 and 510). HGM 512 segments images fully automatically without annotated training images.

First, a hybrid graph is constructed using G=(V, E) for object segmentation including two types of vertices: $V = V_p \cup V_s$, where $V_p$ is a set of vertices representing the object parts and $V_s$ representing the superpixels. The vertices in $V_p$ are mainly connected by directed edges and those in $V_s$ are connected by undirected edges. Initially, the shape prior information is applied to the object parts, and the color and texture prior information are applied to the superpixels.

The HGM 512 makes these two different prior information interact with each other, where the vertices in $V_p$ not only connect to each other, but also connect to those in $V_s$ by undirected edges. As a result, through the extra undirected edges, the shape prior information can also act on the superpixels and the color and texture prior information can also act on the object parts, as well.

Thus, the learning process occurs by coupling two different subsystems: a recognition system represented by the directed subgraph playing the role of finding the object parts belonging to the object(s) and a segmentation system represented by the undirected subgraph that is responsible of grouping superpixels. Thus, the extra undirected edge couples the two subsystems.

The conditional dependence matrix P is defined according to a spatial configuration among the object parts detected in an image. In the HGM 512, a vertex $v_i \in V_p$ denotes an object part $O_i$, observed at location $l_i$. The likelihood of probability can be measured by the following conditional probability:

$$\pi_i = Pr(E_i|C),$$

where $E_i$ is the event of [$O_i$, $l_i$] being observed, for an object class C, to estimate the likelihood of probability of each object part lying inside the object(s) of C.

Since no annotated images are available, it is not easy to define the object class C explicitly. Thus, difficulty exists in directly calculating the likelihood of probability. Therefore, regarding $\pi_i$'s as latent variables and try indirectly calculating the likelihood of probability follows:

$$\pi_j = Pr(E_j|C)$$
$$= \sum_{i \neq j} Pr(E_i|C)Pr(E_j|E_i, C)$$
$$= \sum_{i \neq j} \pi_i Pr(E_j|E_i, C).$$

Comparing the above equation with equation (1) reveals that $p_{ij}$ should be defined as the conditional dependence of $E_j$ on $E_i$, i.e., $p_{ij} = Pr(E_j|E_i, C)$. With the event $E_i$ fixed, $E_j$ is equivalent to a new event $\tilde{E}_{ij} = [O_i, O_j, d_{ij}]$ so that $O_j$ is observed at the location with distance $d_{ij}$ from $O_i$. As a result:

$$p_{ij} = Pr(E_j|E_i, C) \propto Pr(\tilde{E}_{ij}|C).$$

To compute $p_{ij}$, one would need to estimate $Pr(\tilde{E}_{ij}|C)$. By matching $O_i$ and $O_j$ to a codebook of the object class C, a set of interpretations $I_{ij} = \{I_{ij}|I_{ij}$ is the event that $O_i$ and $O_j$ are matched to the visual words $vw_i$ and $vw_j$, respectively$\}$ (i.e., $O_i$ and $O_j$ are interpreted as the visual words $vw_i$ and $vw_j$, respectively) may be obtained.

Next using equation:

$$Pr(\tilde{E}_{ij}|C) = \sum_{I_{i'j'} \in I_{ij}} Pr(I_{i'j'}|C) Pr(\tilde{E}_{ij}|I_{i'j'}, C)$$
$$= \sum_{I_{i'j'} \in I_{ij}} Pr(I_{i'j'}|C) Pr(([vw_i, vw_j, d_{ij}]|I_{i'j'}, C),$$

where $Pr(I_{ij}|C)$ can be computed as $$\frac{1}{|I_{ij}|},$$

assuming the independence on C and the equal probability of each event, and $Pr(([vw_i, vw_j, d_{ij}]|I_{ij}, C)$ can be computed as $$\frac{1}{\sqrt{2\pi}\,\sigma_{i'j'}} \exp\left(-\frac{(d_{ij} - \mu_{ij})^2}{2\sigma_{ij}^2}\right)$$

due to the distribution discussed in the paragraph shown above.

As mentioned previously, the shape prior information cannot be directly applied to the superpixels. As a result, the conditional dependence matrix P is only defined on the vertices of object parts. To be precise, the conditional dependence matrix P is defined as:

$$p_{ij} = \begin{cases} \dfrac{Pr(\tilde{E}_{ij}|C)}{\sum_k Pr(\tilde{E}_{ij}|C)}, & \text{if } v_i \in V_p, v_j \in V_p \\ 0, & \text{otherwise} \end{cases}$$

Next, includes defining homogeneous association matrix A on both object parts and superpixels. The expectation is that the spatially close entities have a similar likelihood of probability, and the object parts should act on nearby superpixels. Likewise, the superpixels should act on object parts. Therefore, the weights are defined differently according to the types of the vertices:

$$a_{ij} = \begin{cases} \exp(-\kappa_1 d_{ij}^2) + s_{ij} & v_i \in V_s, v_j \in V_s \\ \exp(-k_2 d_{ij}) & v_i \in V_p, v_j \in V_s \\ \exp(-\kappa_1 d_{ij}^2) & v_i \in V_p, v_j \in V_p \end{cases}$$

where $$s_{ij} = \begin{cases} 1, & \text{if } v_i \text{ and } v_j \text{ are in the same subregion,} \\ 0, & \text{otherwise.} \end{cases}$$

where $d_{ij}$ is the spatial distance between the entities (object parts or superpixels).

In one exemplary implementation, $\kappa_1$ and $\kappa_2$ are chosen as 0.04 and 0.2, respectively. The extra $s_{ij}$ here further encourages the superpixels belonging to the same subregion to have similar likelihood of probability.

This illustrates a likelihood of probability of the entity lying inside the object. This process occurs by solving a minimum eigenvalue problem to identify a likelihood vector. Thus, this process obtains the likelihood of probability vector giving every object part and superpixel the probability of lying inside desired object. In this process, the segmentation task only needs the likelihood of probability of the superpixels. However, as mentioned, the calculation for that of object parts cannot be waived, because the object parts carry shape prior information that cannot be modeled by the superpixels.

Block 514 shows learning a mask map from an image that gives each superpixel a likelihood of probability of lying inside an object(s). The process integrates all of the prior information into a unified framework and forms a global decision on the boundaries of the objects. As mentioned previously, difficulty exists in directly applying shape prior information to the superpixels and color and texture prior information to the object parts. A way to overcome this problem is to develop the hybrid graph model to learn a mask map.

In one exemplary implementation, uses a mask map where the intensities are normalized to between 0 and 1. Initially, the method segments the mask map into a few regions by agglomerative clustering: the two nearby regions having the closest intensities are merged, as long as the difference between their intensities stays below a certain threshold 0.03. To arrive at the final segmentation result, the method adopts a greedy region growing based method. The method begins with the regions with the intensities greater than 0.6, merges the next adjacent region with the highest intensity until all the intensities of adjacent regions fall below 0.3.

For example, the mask map identifies a probability of each superpixel lying inside the object(s). The mask map solves an eigenvalue problem to accomplish this probability.

Block 516 illustrates fully automatically segmenting the image into a foreground from the background. The foreground includes the object of a class. With this method, there is accurate output of object boundaries.

Exemplary Class-Unsupervised Object Segmentation

Figure 6:
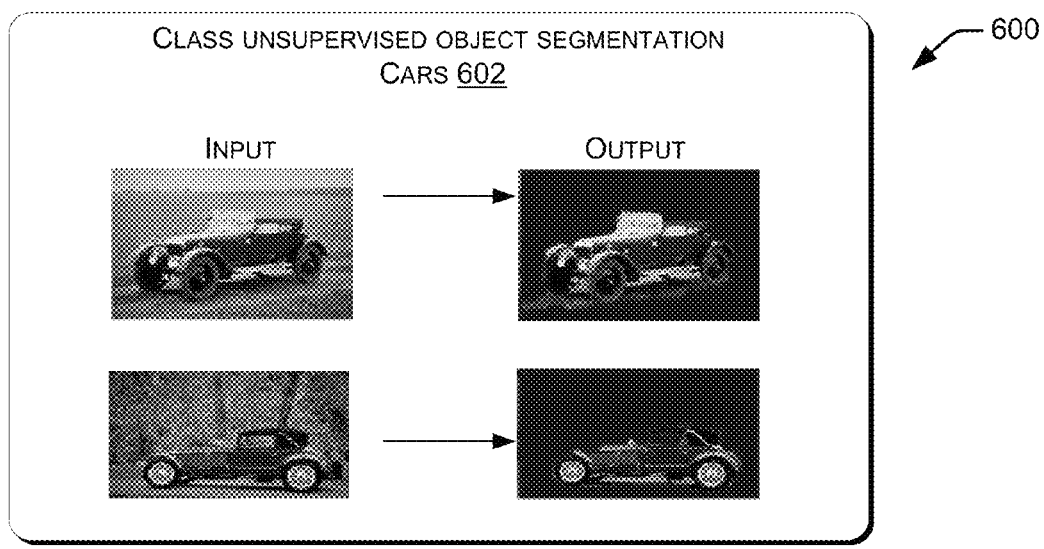
FIG. 6 is a block diagram of exemplary class-unsupervised object segmentation images.
Figure 6:
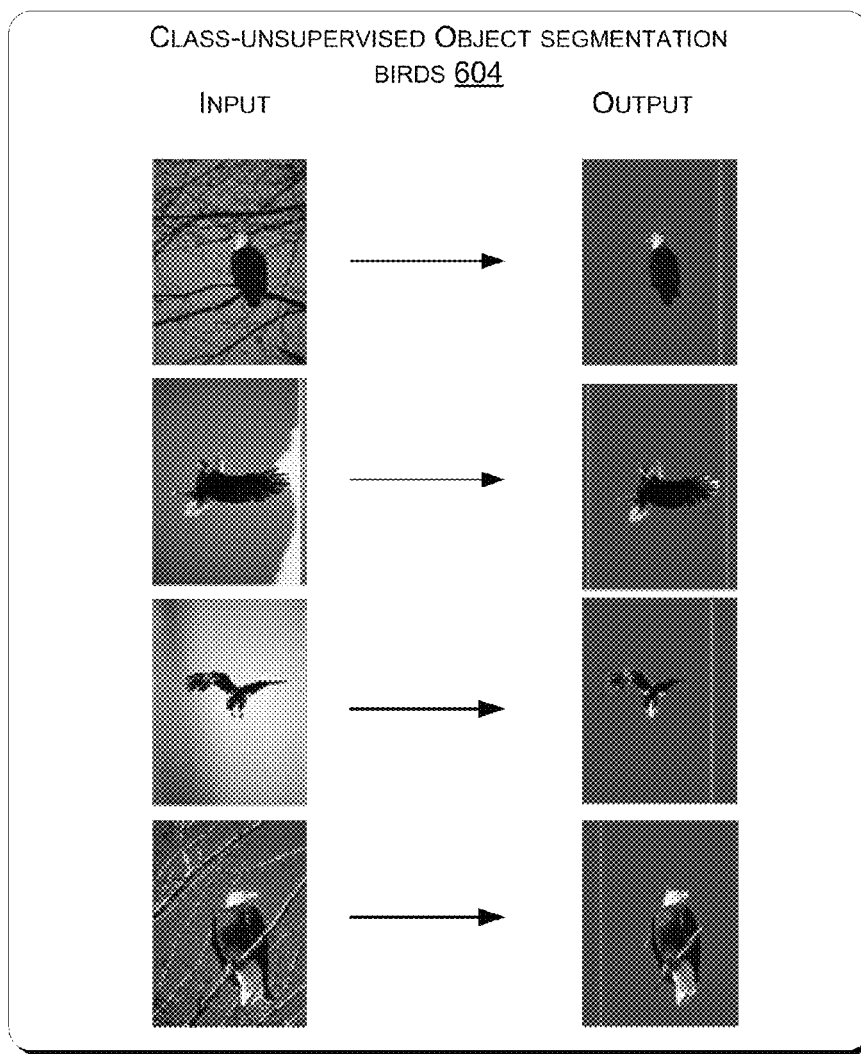

FIG. 6 illustrates examples of class-unsupervised object segmentation. Block 602 illustrates images of cars with various backgrounds. The figures on the right side indicate the images before the process, referred to as input for this example. The figures on the left side illustrate segmenting a large number of images simultaneously through class-unsupervised object segmentation. From segmenting the images on the left side, the resulting foreground is shown as output on the right side.

Block 604 illustrates images of birds with various backgrounds. Again, the left side is referred to as input for this example. These are the images received prior to class-unsupervised object segmentation. The images on the right side have been fully automatic segmented through the class-unsupervised object segmentation 1-6 showing the birds as the foreground objects on the left side.

With this method, multiple objects of the same class are allowed in each image. The method allows larger variation in shape, such as a position, a size, a pose, and a profile within a class. Also, the method allows larger variation in color and texture within a class and within an object.

Optimizing Performance

A goal of constructing a codebook is to select important features that well describe the local appearance of an object class. However, interest point detectors alone are not enough to select good features because the detectors only consider the local information in a single image. The accuracy of the codebook can be improved by the HGM. Given n object parts $\{O_1, \ldots, O_n\}$ extracted from images and the clustering results $\{C_1, \ldots, C_m\}$, instead of using all the clusters as visual words to construct the codebook, the aim is to select k(k<m) clusters that are "important" to an object class.

The importance of a cluster can be computed from the importance of the object parts that belong to the cluster. To this end, designing a hybrid graph G to calculate a likelihood of probability (or score) vector Π, with each $\pi_i$ giving an object part $O_i$ the "likelihood of probability" of being important. The vertices are the object parts with the matrices P and A defined as described below.

Let $\Theta_i$ be the event that the object part $O_i$ is important. The entry $p_{ij}$ of the conditional dependence matrix P should be in the form:

$$p_{ij} = Pr(\Theta_j | \Theta_i),$$

which is the probability of an object part $O_j$ being important, given that another object part $O_i$ is important.

To appropriately define $Pr(\Theta_j | \Theta_i)$, proposing two principles: if an object part is important, then the object parts similar to the object part should also be important, i.e., $Pr(\Theta_j | \Theta_i) \propto \text{Sim}(O_j, O_i)$, and if an object part is distinctive, the object part should be important, i.e., $Pr(\Theta_j | \Theta_i) \propto \text{dst}(O_j)$.

In this process, relying on a Euclidean distance $d_g(O_i, O_j)$ between the grayscale vectors to measure the similarity between $O_i$ and $O_j$. The distinctiveness of an object part is defined according to a heuristic notion: an object part is distinctive if there is another object part which is close to the object part in space, but far away from the object part in texture. Therefore, the distinctiveness of the part $O_j$ can be computed as:

$$\text{dst}(O_j) = \max_O \frac{d_g(O, O_j)}{d_s(O, O_j)},$$

where O is another object part that is detected in the same image with $O_j$ and $d_s(O, O_j)$ is the spatial distance between O and $O_j$. Summing up, the process may make $Pr(\Theta_j | \Theta_i)$ proportional to $\bar{p}_{ij}$, where $$\bar{p}_{ij} = \exp(-\lambda d_g(O_i, O_j) / \text{dst}(O_j)),$$

in which $\lambda = 0.2$ is a parameter. Consequently, $p_{ij}$ is defined as $$p_{ij} = \frac{\bar{p}_{ij}}{\sum_k \bar{p}_{ik}},$$

by normalizing the probability to 1. With this definition, an object part will have a high importance score if there are many other object parts similar to the object part and the object part is distinctive itself.

However, the homogeneous association matrix A is defined to encourage that the object parts belonging to the same cluster to have a close score:

$$a_{ij} = \begin{cases} 1, & \text{if } O_i \text{ and } O_j \text{ belong to the same cluster,} \\ 0, & \text{otherwise.} \end{cases}$$

By solving the minimum eigenvalue problem in equation (1), the importance of each part is identified. Then for a cluster $C_i$, which computes the cluster importance according to the scores of its member object parts:

$$IMP(C_i) = |C_i| \sum_{O_j \in C_i} \pi_j,$$

where $|C_i|$ is the number of parts belonging to $C_i$ and $\pi_j$ is the importance of part $O_j$. Note that clusters with wide coverage (more member parts) are favored by multiplying the sum of scores with $|C_i|$. Then the clusters are sorted in descending order of importance, and selecting the top k(k=30) clusters with positive importance scores to construct the codebook. As a result, this approach can make the segmentation more accurate.

This disclosure describes a unified approach for class-unsupervised object segmentation. The framework supports automatic object segmentation, provides an efficient tool to integrate segmentation and recognition. This process achieves higher segmentation accuracies than previous approaches. Furthermore, this process benefits from a mid-level clustering algorithm that HGM adopts, which preserves boundaries of homogeneous color and/or texture during the grouping process. Also, HGM segments images along these boundaries to provide an accurate output of object boundaries.

This process uses HGM for performing class specific object segmentation without annotated training images. The core is a general learning algorithm based on hybrid graph topology. Object segmentation is achieved by coupling recognition and segmentation: obtain local shape prior information of an object class (for recognition) and color/texture prior information of an image (for segmentation), and then using the hybrid graph model to integrate shape and color/texture priors into a unified framework. A mask map is computed for each image by solving an eigenvalue problem. HGM is a general framework that can be applied to various problems as long as the meanings of the graph vertices, the relationship represented by the directed/undirected edges, and the two matrices P and A can be interpreted appropriately.

Exemplary Computing Environment

Figure 7:
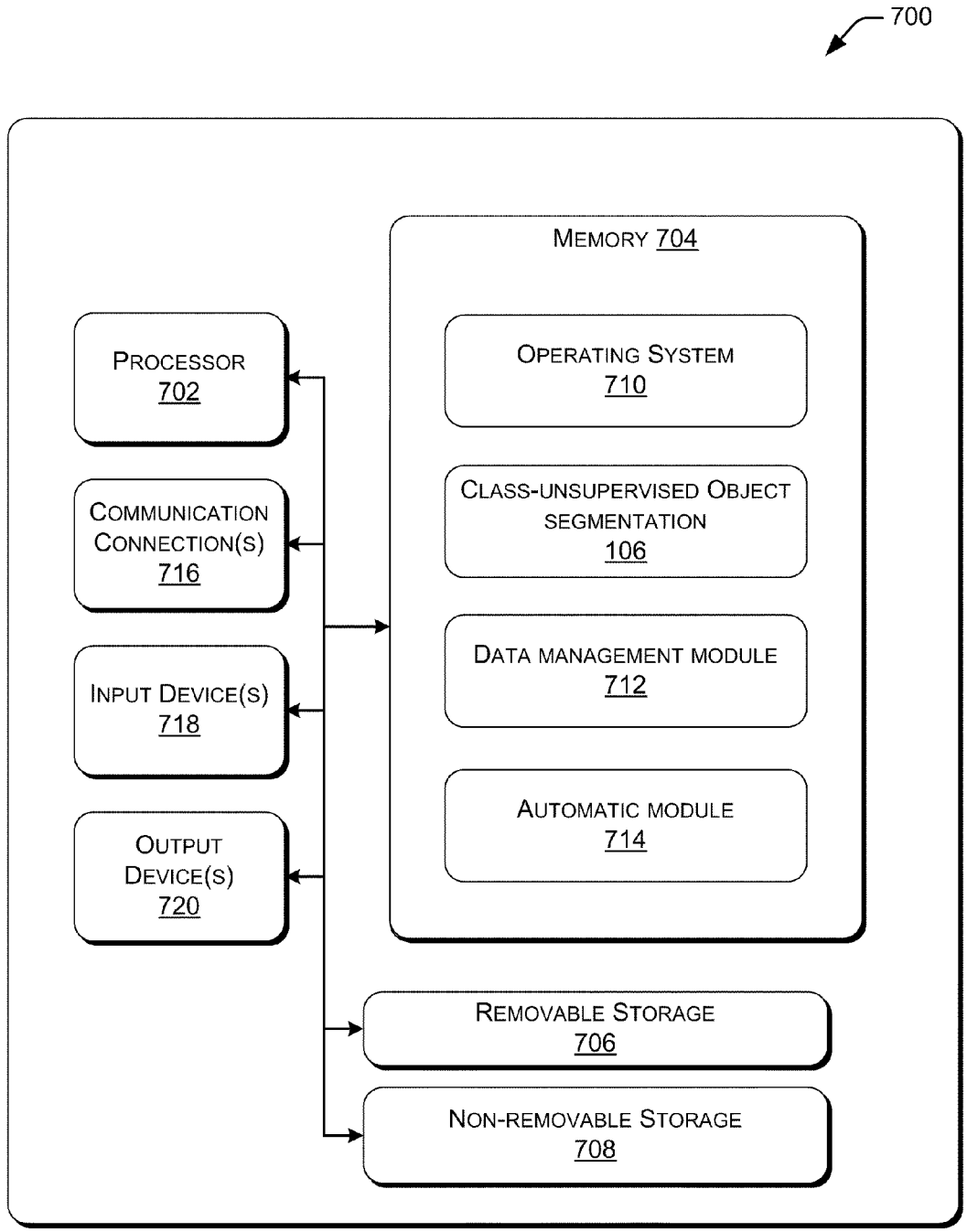
FIG. 7 is a block diagram of an exemplary environment for implementing a class-unsupervised object segmentation.

FIG. 7 is a schematic block diagram of an exemplary general operating environment 700. The environment 700 may be configured as any suitable system capable of implementing class-unsupervised object segmentation 106. In one exemplary configuration, the system comprises at least one processor 702 and memory 704. The processing unit 702 may be implemented as appropriate in hardware, software, firmware, or combinations thereof. Software or firmware implementations of the processing unit 702 may include computer- or machine-executable instructions written in any suitable programming language to perform the various functions described.

Memory 704 may store programs of instructions that are loadable and executable on the processor 702, as well as data generated during the execution of these programs. Depending on the configuration and type of computing device, memory 704 may be volatile (such as RAM) and/or non-volatile (such as ROM, flash memory, etc.). The system may also include additional removable storage 706 and/or non-removable storage 708 including, but not limited to, magnetic storage, optical disks, and/or tape storage. The disk drives and their associated computer-readable media may provide non-volatile storage of computer readable instructions, data structures, program modules, and other data for the communication devices.

Turning to the contents of the memory 704 in more detail, may include an operating system 710, one or more class-unsupervised object segmentation application programs 106 for implementing all or a part of the object segmentation. For example, the system 700 illustrates architecture of these components residing on one system or one server. Alternatively, these components may reside in multiple other locations, servers, or systems. For instance, all of the components may exist on a client side. Furthermore, two or more of the illustrated components may combine to form a single component at a single location.

In one implementation, the memory 704 includes the class-unsupervised object segmentation application program 106, a data management module 712, and an automatic module 714. The data management module 712 stores and manages storage of information, such as constraints, graphics, design tools, and the like, and may communicate with one or more local and/or remote databases or services. The automatic module 714 allows the process to operate without human intervention.

Computer storage media includes volatile and nonvolatile, removable and non-removable media implemented in any method or technology for storage of information such as computer readable instructions, data structures, program modules or other data. Memory 704, removable storage 706, and non-removable storage 708 are all examples of computer storage media. Additional types of computer storage media that may be present include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 104.

The system 700 may also contain communications connection(s) 716 that allow processor 702 to communicate with servers, the user terminals, and/or other devices on a network. Communications connection(s) 716 is an example of communication media. Communication media typically embodies computer readable instructions, data structures, and program modules. By way of example, and not limitation, communication media includes wired media such as a wired network or direct-wired connection, and wireless media such as acoustic, RF, infrared and other wireless media. The term computer readable media as used herein includes both storage media and communication media.

The system 700 may also include input device(s) 718 such as a keyboard, mouse, pen, voice input device, touch input device, etc., and output device(s) 720, such as a display, speakers, printer, etc. The system 700 may include a database hosted on the processor 702. All these devices are well known in the art and need not be discussed at length here.

The subject matter described above can be implemented in hardware, or software, or in both hardware and software. Although the subject matter has been described in language specific to structural features and/or methodological acts, it is to be understood that the subject matter defined in the appended claims is not necessarily limited to the specific features or acts described above. Rather, the specific features and acts are disclosed as exemplary forms of implementing the claimed subject matter. For example, the methodological acts need not be performed in the order or combinations described herein, and may be performed in any combination of one or more acts.

What is claimed is:

1. A method of modeling a relationship between entities for object segmentation, implemented at least partially by a processor, the method comprising:
    modeling by the processor, the relationship between the entities that are associated with an object class or features of images by:
        extracting object parts from objects belonging to the object class;
        collecting features from the objects of the images;
        representing a first relationship of a conditional dependence, wherein one entity is dependent on an occurrence of another entity;
        representing a second relationship of a homogeneous association between two entities, the homogeneous association is based at least in part on a similarity of color and texture; and
    constructing a hybrid graph to model the relationship based at least in part on the first relationship and the second relationship.

2. The method of claim 1, wherein the hybrid graph comprises
    a finite vertex set representing an entity, and an edge set with each edge connecting a pair of vertices.

3. The method of claim 1, further comprising assigning weights to a directed edge of the hybrid graph to represent the first relationship of the conditional dependence and assigning weights to an undirected edge to represent the second relationship of the homogeneous association.

4. The method of claim 1, wherein the conditional dependence represents a concurrence of the object parts, comprising:
    a conditional dependence matrix, which represents a number of entities and measures the conditional dependence of the one entity on the occurrence of the another entity.

5. The method of claim 1, wherein the homogeneous association comprises:
    a homogeneous association matrix, which represents a number of entities, and measures the homogeneity between the two entities.

6. The method of claim 1, further comprising:
    inferring a likelihood of a probability that an entity belongs to an object, based on a vertex in the hybrid graph is associated with a likelihood of a probability vector;
    illustrating that a directed edge of the hybrid graph depends on the vertex, which indicates the vertex is more likely to belong to the object than the directed edge and
    forming an interdependence among the entities with a Markov Chain, with a transition matrix to represent the entities transitioning from one state to another state, which results in a stationary distribution of the transition matrix that assigns each entity a likelihood of probability of belonging to the object.

7. The method of claim 6, further comprising:
    determining the homogeneous association between the two entities are a strong association to indicate the two entities are likely to belong to the object; and
    minimizing a cost for object segmentation based on the strong association of the two entities.

8. The method of claim 7, further comprising applying an optimization problem to calculate a likelihood of a probability vector occurs
    such that a positive parameter balances effects of the likelihood of probability and the minimization of cost of the object segmentation.

9. A computer-readable storage device encoded with instructions that, when executed by a processor, perform operations comprising:
    modeling a relationship between entities in images, the entities associated with an object in an object class or features of the object; and
    representing the entities in the relationship by constructing a hybrid graph, the entities represented as vertices being connected with edges in the hybrid graph, wherein the hybrid graph includes two types of vertices, one set of vertices representing the object based on object parts and another set of vertices representing the features based on superpixels, the object parts vertices are connected by directed edges and the superpixels vertices are connected by undirected edges.

10. The computer-readable storage device of claim 9, further comprising representing a conditional dependence of one entity dependent on an occurrence of another entity, with a directed edge to form a connection for a shape of the object.

11. The computer-readable storage device of claim 9, further comprising representing a homogeneous association between a pair of entities, with an undirected edge to identify the features of color and texture.

12. The computer-readable storage device of claim 9, further comprising determining a homogenous association between a pair of entities is similar in features of color or texture and likely to belong to the object.

13. The computer-readable storage device of claim 9, further comprising determining a homogenous association between a pair of entities by acquiring color and texture by oversegmenting the images into superpixels.

14. A system comprising:
    a memory;
    a processor coupled to the memory;
    a hybrid graph system operated by the processor and configured to construct a hybrid graph to model a relationship between entities associated with an object class or features of images, the hybrid graph being constructed includes vertices of object parts from the images and vertices of superpixels of features of the images;
    a recognition system operated by the processor and configured to construct a directed subgraph joining the vertices of the object parts; and
    a segmentation system operated by the processor and configured to construct an undirected subgraph joining the vertices of the superpixels.

15. The system of claim 14, the hybrid graph system operated by the processor and further configured to connect the vertices of the object part to the vertices of superpixels of features of the images with an undirected edge to interact shape of the object parts on the superpixels and to interact color and texture of the features on the object parts.

16. The system of claim 14, the hybrid graph system operated by the processor and further configured to represent a conditional dependence relationship of one entity dependent on an occurrence of the another entity, with a directed edge to form a connection for a shape of the object.

17. The system of claim 14, the hybrid graph system operated by the processor and further configured to represent a homogeneous association between the pair of entities with an undirected edge to identify the features of color and texture for the pair of entities.

18. The system of claim 14, the recognition system operated by the processor and further configured to obtain shape information of the object class for recognition.

19. The system of claim 14, the segmentation system operated by the processor and further configured to group the superpixels based on color and texture into groups for segmentation.

* * * * *